United States Patent
Hicks et al.

(10) Patent No.: US 11,347,849 B2
(45) Date of Patent: May 31, 2022

(54) RANSOMWARE DETECTION AND PREVENTION

(71) Applicant: INTERNATIONAL BUSINESS MACHINES CORPORATION, Armonk, NY (US)

(72) Inventors: Andrew C. M. Hicks, Wappingers Falls, NY (US); Michael Peter Lyons, Arlington, MA (US); Miles C. Pedrone, Wappingers Falls, NY (US); Tynan J. Garrett, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 16/839,293

(22) Filed: Apr. 3, 2020

(65) Prior Publication Data

US 2021/0312046 A1  Oct. 7, 2021

(51) Int. Cl.
*G06F 21/00* (2013.01)
*G06F 21/56* (2013.01)
*G06F 21/60* (2013.01)
*G06F 12/14* (2006.01)

(52) U.S. Cl.
CPC ........ *G06F 21/561* (2013.01); *G06F 12/1458* (2013.01); *G06F 21/602* (2013.01); *G06F 2212/1052* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,856,542 B2 | 10/2014 | Tatarinov et al. | |
| 9,807,115 B2 | 10/2017 | Kolton et al. | |
| 9,888,032 B2 | 2/2018 | Dekel et al. | |
| 10,169,586 B2 | 1/2019 | Maciejak et al. | |
| 10,193,918 B1 | 1/2019 | Patton et al. | |
| 10,262,138 B2 | 4/2019 | Boutnaru | |
| 10,262,139 B2 | 4/2019 | Viswanath et al. | |
| 10,469,525 B2 * | 11/2019 | Hittel | H04L 63/1433 |
| 2018/0107824 A1 | 4/2018 | Gibbons, Jr. et al. | |

(Continued)

FOREIGN PATENT DOCUMENTS

EP  3396580 B1  10/2018

OTHER PUBLICATIONS

Song, Chengyu et al. HDFI: Hardware-Assisted Data-Flow Isolation. 2016 IEEE Symposium on Security and Privacy (SP). https://ieeexplore.ieee.org/stamp/stamp.jsp?tp=&arnumber=7546472 (Year: 2016).*

(Continued)

*Primary Examiner* — Jeremiah L Avery
(74) *Attorney, Agent, or Firm* — Cantor Colburn LLP; Teddi Maranzano (57) ABSTRACT

Embodiments are described for detecting ransomware attacks. Aspects include receiving a memory access request for a memory location. Aspects also include allowing the memory access request based on a determination that the memory location is not present in a decoy address table. Aspects further include terminating a process that made the memory access request based on a determination that the memory location is present in the decoy address table.

17 Claims, 4 Drawing Sheets

(56) References Cited

U.S. PATENT DOCUMENTS

2018/0115577 A1    4/2018  Shukla et al.
2018/0212987 A1    7/2018  Tamir et al.
2018/0293379 A1*  10/2018  Dahan .................... G06F 21/566
2020/0125723 A1*   4/2020  Lam ........................ G06F 21/80
2020/0387609 A1*  12/2020  Hansen ................. G06F 21/554

OTHER PUBLICATIONS

Khattab S. et al. Live Baiting for Service-Level DoS Attackers. IEEE INFOCOM 2008—The 27th Conference on Computer Communications. https://ieeexplore.ieee.org/stamp/stamp.jsp?tp=&arnumber=4509638 (Year: 2008).*

El-Kosairy, Ahmed et al. "Intrusion and Ransomware Detection System" 2018 IEEE, 9978-1-5386-4427-D; 7 pgs.

Moore, Chris "Detecting Ransomware with Honeypot techniques" 2016 Cybersecurity and Cyberforensics Conference; 2016 IEEE, pp. 77-81.

Surati, Sonu B. et al. "A Review on Ransomware Detection & Prevention" International Journal of Research and Scientific Innovation, vol. 4, Issue IX, Sep. 2017; ISSN 2321-2705; pp. 86-91.

\* cited by examiner

RANSOMWARE DETECTION AND PREVENTION

BACKGROUND

The present invention relates generally to the field of computer security, and more particularly to ransomware detection and prevention.

In the constant world of evolving threats, our computer systems must always be designed to be robust and reliable. Recent threats, such as ransomware, do not seek to destroy computer systems but rather encrypt files on a computer system. Ransomware typically works by scanning the file system of a computer looking for appealing looking files, backups, etc. to encrypt them. Once these files are identified and encrypted the ransomware provides instructions for the user, including payment instructions, follow to get their files back.

Currently, there are many ways to detect and protect computer systems against ransomware attacks, however, many are based on disconnected hardware and software stacks making it hard to effectively respond to attack in a timely fashion or build models that may not work all of the time.

SUMMARY

An aspect includes a computer-implemented method for detecting a ransomware attack. The method includes receiving a memory access request for a memory location. The method also includes allowing the memory access request based on a determination that the memory location is not present in a decoy address table. The method further includes terminating a process that made the memory access request based on a determination that the memory location is present in the decoy address table.

Another aspect includes a system including a memory and a processor. The processor is operable to receive a memory access request for a memory location. The processor is also operable to allow the memory access request based on a determination that the memory location is not present in a decoy address table. The processor is further operable to terminate a process that made the memory access request based on a determination that the memory location is present in the decoy address table.

Another aspect includes a computer program product including a non-transitory computer readable storage medium having program instructions embodied therewith, the program instructions being executable by a processor to cause the processor to perform a method. The method includes receiving a memory access request for a memory location. The method also includes allowing the memory access request based on a determination that the memory location is not present in a decoy address table. The method further includes terminating a process that made the memory access request based on a determination that the memory location is present in the decoy address table.

BRIEF DESCRIPTION OF THE DRAWINGS

The examples may be better understood with reference to the following figures and description. The components in the figures are not necessarily to scale. Moreover, in the figures, like-referenced numerals designate corresponding parts throughout the different views.

Additional features and advantages are realized through the techniques of the technical solutions, examples, and aspects of which, are described in detail herein.

DETAILED DESCRIPTION

Embodiments of the present invention provide systems and methods for detecting and preventing a ransomware attack. In exemplary embodiments, a plurality of decoy memory areas, are disposed in a memory to protect the memory from a ransomware attack. The decoy memory areas are small areas of memory that are not used by a computing system for any purpose. Accordingly, when a process is detected attempting to access one of the decoy memory areas, the process can be assumed to be malicious. In exemplary embodiments, the addresses of the decoy memory areas are stored in a decoy address table and all memory access requests are checked against the decoy address table to ensure no malicious activity is detected.

Figure 1:
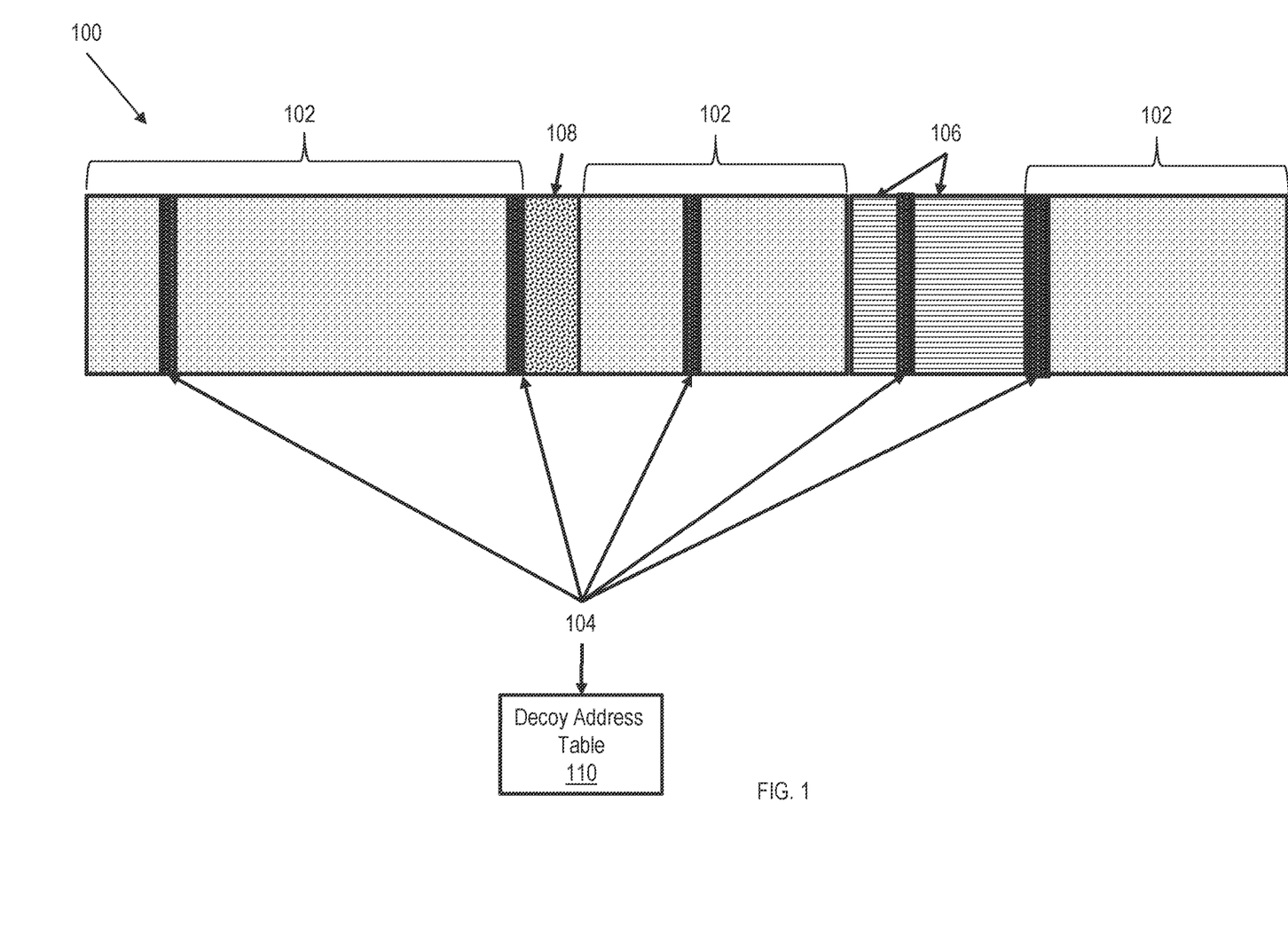
FIG. 1 is a block diagram of memory including a plurality of decoy areas in accordance with an embodiment of the present invention.

Referring now to FIG. 1, a block diagram of memory 100 including a plurality of decoy areas 104 in accordance with an embodiment of the present invention is shown. In exemplary embodiments, the memory 100 includes one or more high priority files 102, one or more other files 106 and unused areas 108. In exemplary embodiments, high priority files 102 include files that include sensitive user data, system backups, most frequently used data areas and other file types that are traditionally targeted by ransomware. In exemplary embodiments, at least one decoy area 104 is associated with each high priority file 102. In one embodiment, a decoy area 104 is appended to the beginning or end of high priority files. Likewise, a decoy area 104 can be disposed within the high priority files. Furthermore, decoy areas 104 can also be associated with the one or more other files 106 and unused areas 108.

Figure 4:
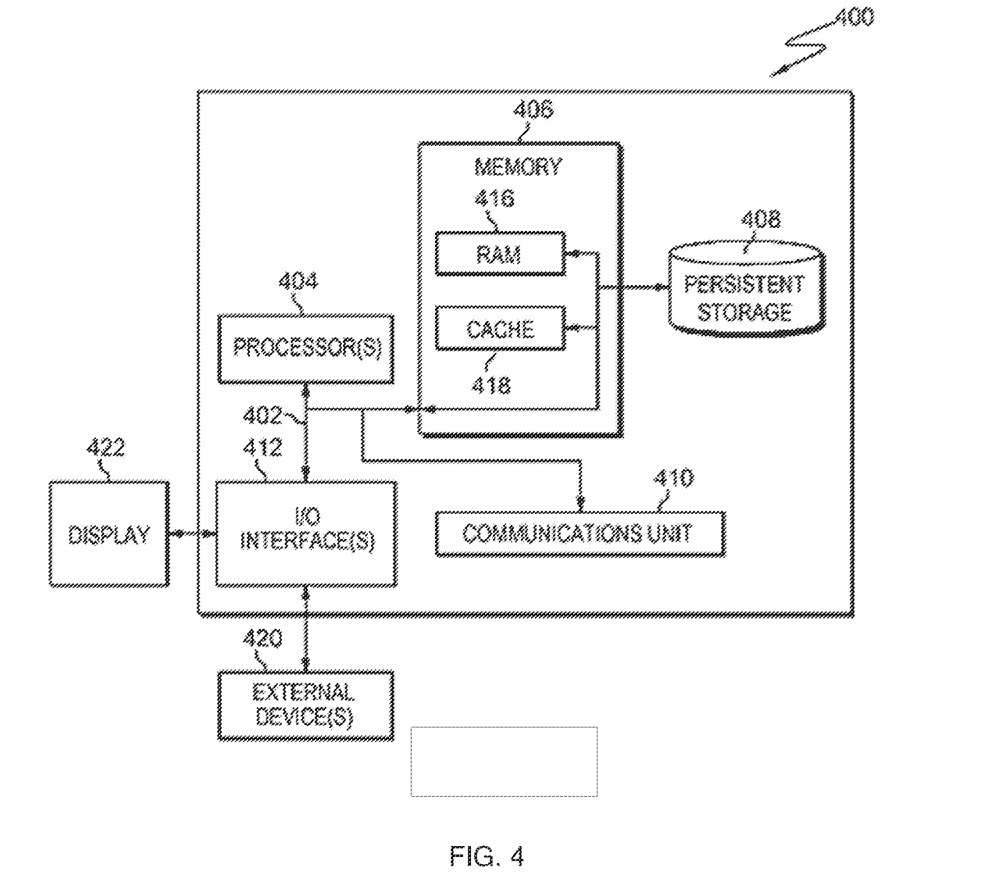
FIG. 4 is a block diagram of internal and external components of a computer system, in accordance with an embodiment of the present invention.

In exemplary embodiments, a decoy address table 110 is configured to store the memory locations of each decoy area 104. In one embodiment, the decoy address table 110 is configured as a binary search table to allow addresses to be quickly searched. The memory 100 can be any type of data storage such as memory 406 and persistent storage 408, as shown in FIG. 4. In exemplary embodiments, the memory 100, including the decoy memory areas are, is disposed in a storage area network that is coupled to a computer system and the computer system includes a copy of the decoy address table 110. In one embodiment, a high priority file list is maintained through an update process that can be done through the internet to a central source.

Figure 2:
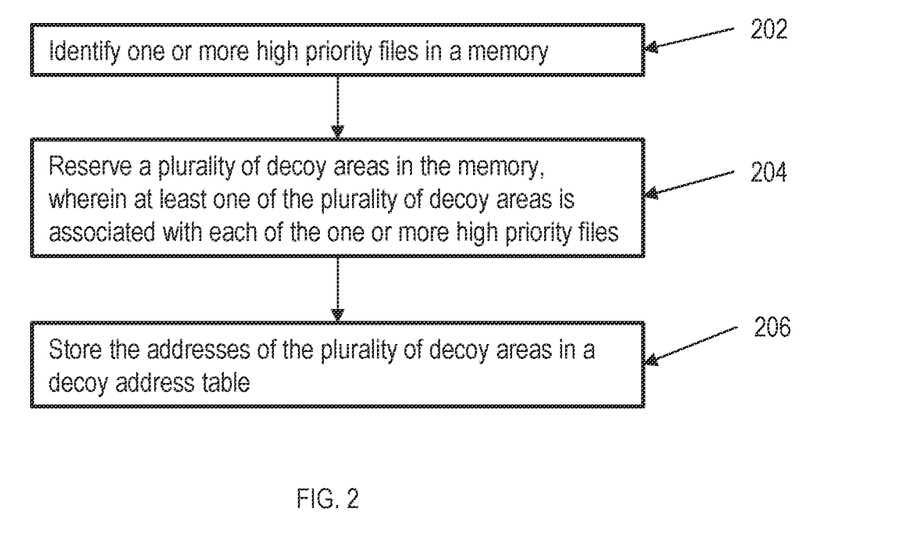
FIG. 2 is a flowchart depicting a method for creating a decoy address table in accordance with an embodiment of the present invention.

Referring now to FIG. 2, a flowchart depicting a method for creating a decoy address table in accordance with an embodiment of the present invention is shown. As shown at block 202, the method begins by identifying one or more high priority files in a memory. In one embodiment, the one or more high priority files are identified based at least in part on a listing of files received from a central location, such as from the creator of the operating system of the computer. In another embodiment, the one or more high priority files are identified based at least in part on identifying the most recently accessed files in the computer system. In a further embodiment, the one or more high priority files are identified based at least in part on scanning the files of the computer system for files that contain sensitive user data or for specific file types.

After the one or more high priority files are identified, the method includes reserving a plurality of decoy areas in the memory. In exemplary embodiments, at least one of the plurality of decoy areas is associated with each of the one or more high priority files. In one embodiment, the decoy areas are be appended to a beginning or end of the high priority files. In another embodiment, the decoy areas are be inserted in a random location within each of the high priority files. After the decoy areas are associated with the high priority files, the appearance of high priority files remains unchanged to all programs and processes executing on the computer system in which the memory is located. That is, it will not be apparent to other programs executing on the computer system that the decoy areas have been added to the high priority files. Rather, only the memory subsystem of the computer system will be aware of the presence of the decoy areas. The method concludes by storing the addresses of each decoy area in the decoy address table.

Figure 3:
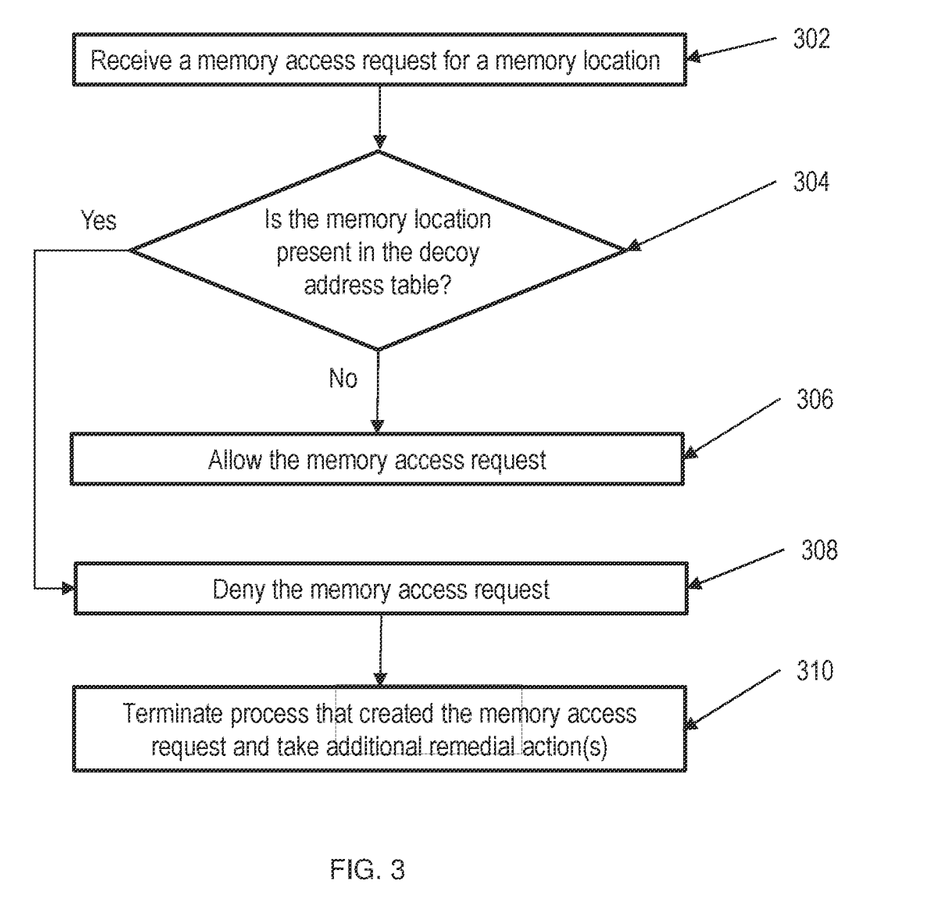
FIG. 3 is a block diagram of detecting a ransomware attack in accordance with an embodiment of the present invention.

Referring now to FIG. 3, a block diagram of detecting a ransomware attack in accordance with an embodiment of the present invention is shown. The method begins at block 302 by receiving a memory access request for a memory location. In exemplary embodiments, the memory access request is an encryption request. Next, as shown at decision block 304, the method includes determining if the memory location is present in a decoy address table. If the memory location is not present in the decoy address table, the method proceeds to block 306 and permits the memory access request to be performed. However, if the memory location is present in the decoy address table, the method proceeds to block 308 and denies the memory access request. The method concludes at block 310 by terminating the process that created the memory access request and optionally taking additional remedial actions. In exemplary embodiments, the additional remedial actions include one or more of creating an alert of a suspected ransomware attack, beginning a backup of the high priority files, or the like.

In exemplary embodiments, when ransomware infects a computer system the ransomware immediately begins searching for files to encrypt. Once the ransomware identifies the files, it begins encrypting the files by requesting that the processor access the files and begin encrypting, in some cases using a crypto unit of the processor. A crypto unit is a pipelined processing unit that divides up the crypto operations so many of them can be done in parallel and near real time. As a result, the address will need to be drawn out of the encryption request and sent to the memory sub-system that has access to the decoy address table. If the call to the memory sub-system is negative, i.e., the address is not present in the decoy address table, then the operation proceeds out of the encryption unit, otherwise it cancels the request. Upon canceling a request, the processor is configured to terminate the process that asked for the encryption to be done and notifies the system administrator to take the appropriate remediation.

In exemplary embodiments, the decoy address table is configured such that it can be quickly and easily searched. For example, in one embodiment, the decoy address table is configured as a binary search table so that it is scalable for large memory systems. In some embodiments, one or more of the decoy memory areas are configured to appear as a high priority file. For example, in one embodiment, rather than a decoy memory area being a small memory area inserted in a file, one decoy memory area is configured such that it appears as an entire high priority file, such as a file containing fake sensitive user data or a fake system backup file.

Referring now to FIG. 4, a computing device 400 for practicing the teachings herein is shown. The computing device 400 includes communications fabric 402, which provides for communications between one or more processing units 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computing device 400. For example, I/O interface 412 can provide a connection to one or more external devices 420 such as a keyboard, computer mouse, touch screen, virtual keyboard, touchpad, pointing device, or other human interface devices. External devices 420 can also include portable computer readable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The examples in the present document have been presented for purposes of illustration and description, and not intended to be exhaustive or limited to those in the form disclosed. Many modifications and variations will be apparent to those of ordinary skill in the art without departing from the scope and spirit of the present document. The examples were chosen and described in order to best explain the principles of the technical solutions and the practical application, and to enable others of ordinary skill in the art to understand the various examples with various modifications as are suited to the particular use contemplated.

The technical solutions may be implemented as a system, a method, and/or a computer program product. The computer program product may include a computer readable storage medium (or media) having computer readable program instructions thereon for causing a processor to carry out aspects of the technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the technical solutions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described throughout the present application.

Aspects of the present application are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples described throughout the present document. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples in the present document have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A computer-implemented method for detecting ransomware, the method comprising:
    receiving a memory access request for a memory location;
    based on a determination that the memory location is not present in a decoy address table, allowing the memory access request; and
    based on a determination that the memory location is present in the decoy address table, terminating a process that made the memory access request,
    wherein the decoy address table is created by:
        identifying one or more high priority files in a memory, wherein the one or more high priority files includes one or more of sensitive user data and system backups;
        reserving a plurality of decoy areas in the memory, wherein at least one of the plurality of decoy areas is associated with each of the one or more high priority files; and
        storing the addresses of the plurality of decoy areas in the decoy address table.

2. The computer-implemented method of claim 1, further comprising creating an alert of a detected malicious event based on the determination that the memory location is present in the decoy address table.

3. The computer-implemented method of claim 1, wherein an appearance of the one or more high priority files to other programs is unchanged by reserving the plurality of decoy areas in the memory.

4. The computer-implemented method of claim 3, wherein the at least one of the plurality of decoy areas associated with each of the one or more high priority files is appended to one of a beginning and an ending of a memory block containing the one or more high priority files.

5. The computer-implemented method of claim 1, wherein the memory access request is an encryption request.

6. The computer-implemented method of claim 1, wherein the decoy address table includes addresses of a plurality of decoy areas in the memory and wherein the plurality of decoy areas are randomly allocated small memory areas in the memory.

7. A system, comprising:
    a memory; and
    a processor; wherein the processor is configured to:
        receive a memory access request for a memory location;
        based on a determination that the memory location is not present in a decoy address table, allow the memory access request; and
        based on a determination that the memory location is present in the decoy address table, terminate a process that made the memory access request,
    wherein the decoy address table is created by:
        identifying one or more high priority files in a memory, wherein the one or more high priority files includes one or more of sensitive user data and system backups;
        reserving a plurality of decoy areas in the memory, wherein at least one of the plurality of decoy areas is associated with each of the one or more high priority files; and
        storing the addresses of the plurality of decoy areas in the decoy address table.

8. The system of claim 7, wherein the processor is further configured to create an alert of a detected malicious event based on the determination that the memory location is present in the decoy address table.

9. The system of claim 7, wherein an appearance of the one or more high priority files to other programs is unchanged by reserving the plurality of decoy areas in the memory.

10. The system of claim 7, wherein the at least one of the plurality of decoy areas associated with each of the one or more high priority files is appended to one of a beginning and an ending of a memory block containing the one or more high priority files.

11. The system of claim 7, wherein the memory access request is an encryption request.

12. The system of claim 7, wherein the decoy address table includes addresses of a plurality of decoy areas in the memory and wherein the plurality of decoy areas are randomly allocated small memory areas in the memory.

13. A computer program product comprising a non-transitory computer readable storage medium having program instructions embodied therewith, the program instructions being executable by a processor to cause the processor to perform a method comprising:
    receiving a memory access request for a memory location;

based on a determination that the memory location is not present in a decoy address table, allowing the memory access request; and based on a determination that the memory location is present in the decoy address table, terminating a process that made the memory access request, wherein the decoy address table is created by:
   identifying one or more high priority files in a memory, wherein the one or more high priority files includes one or more of sensitive user data and system backups;
   reserving a plurality of decoy areas in the memory, wherein at least one of the plurality of decoy areas is associated with each of the one or more high priority files; and
   storing the addresses of the plurality of decoy areas in the decoy address table.

14. The computer program product of claim 13, wherein the method further comprises creating an alert of a detected malicious event based on the determination that the memory location is present in the decoy address table.

15. The computer program product of claim 13, wherein an appearance of the one or more high priority files to other programs is unchanged by reserving the plurality of decoy areas in the memory.

16. The computer program product of claim 13, wherein the at least one of the plurality of decoy areas associated with each of the one or more high priority files is appended to one of a beginning and an ending of a memory block containing the one or more high priority files.

17. The computer program product of claim 16, wherein the memory access request is an encryption request.

* * * * *